(12) United States Patent
Gesmer

(10) Patent No.: US 8,783,699 B2
(45) Date of Patent: Jul. 22, 2014

(54) TRUCK AND WHEEL BEARING ASSEMBLY

(76) Inventor: Daniel Jon Gesmer, Boulder, CO (US)

( * ) Notice: Subject to any disclaimer, the term of this patent is extended or adjusted under 35 U.S.C. 154(b) by 0 days.

(21) Appl. No.: 13/506,749

(22) Filed: May 15, 2012

(65) Prior Publication Data

US 2013/0308887 A1  Nov. 21, 2013

(51) Int. Cl.
*B62M 1/00* (2010.01)
*A63C 17/01* (2006.01)

(52) U.S. Cl.
USPC ..................................... 280/87.042

(58) Field of Classification Search
USPC .............. 280/11.27–11.28, 87.041–87.042
See application file for complete search history.

(56) References Cited

U.S. PATENT DOCUMENTS

| | | | | |
|---|---|---|---|---|
| 4,109,925 A * | 8/1978 | Williams et al. | ........... | 280/11.28 |
| 6,315,304 B1 * | 11/2001 | Kirkland et al. | ........... | 280/11.28 |
| 6,428,023 B2 * | 8/2002 | Reyes et al. | .............. | 280/87.042 |
| 6,523,837 B2 * | 2/2003 | Kirkland | .................... | 280/11.28 |
| 7,093,842 B2 * | 8/2006 | Chmelar | ................... | 280/87.042 |
| 8,047,556 B2 * | 11/2011 | Jang et al. | ................ | 280/87.042 |
| 8,297,630 B2 * | 10/2012 | O'Rourke | ................ | 280/87.042 |
| 8,459,669 B2 * | 6/2013 | Lin | .......................... | 280/87.042 |
| 8,500,136 B2 * | 8/2013 | Palmer et al. | ............ | 280/11.215 |
| 2001/0038187 A1 * | 11/2001 | Reyes et al. | .............. | 280/87.042 |
| 2004/0145142 A1 * | 7/2004 | Wang | ........................ | 280/87.042 |
| 2004/0207169 A1 * | 10/2004 | Kent et al. | ................. | 280/87.042 |
| 2004/0245738 A1 * | 12/2004 | Inchley | ..................... | 280/87.042 |
| 2005/0051983 A1 * | 3/2005 | Williams | ................. | 280/87.042 |
| 2005/0051984 A1 * | 3/2005 | Williams | ................. | 280/87.042 |
| 2005/0093262 A1 * | 5/2005 | Chang | ...................... | 280/87.042 |
| 2006/0097470 A1 * | 5/2006 | Chmelar | ................... | 280/87.042 |
| 2010/0314851 A1 * | 12/2010 | Palmer et al. | ............ | 280/87.042 |
| 2010/0327547 A1 * | 12/2010 | Wilson et al. | ............ | 280/87.042 |
| 2011/0140385 A1 * | 6/2011 | Fraley | ...................... | 280/87.042 |
| 2012/0098222 A1 * | 4/2012 | Chan | ........................ | 280/87.041 |
| 2013/0069331 A1 * | 3/2013 | Yamada | ................... | 280/87.042 |

* cited by examiner

*Primary Examiner* — Jeffrey J Restifo
*Assistant Examiner* — Erez Gurari
(74) *Attorney, Agent, or Firm* — Gregory B. Beggs

(57) ABSTRACT

An improved skateboard or roller-skate truck and wheel bearing assembly is disclosed containing an axle bearing yoke, base, grommet, and wheel and bearing combination which delivers improved steering precision, steering control, and wheel alignment. A grommet in the truck includes a bearing surface on a face which engages a bearing member in the yoke and restricts arcuate movements of the yoke and wheels. The contours of the grommet are also unique and contribute to steering control. The wheel and bearing combination incorporates paired bearing casings with bell-shaped members in their ends which meet each other inside a wheel of the board or skate and self-adjust to accommodate imperfections in the bearing seat levelness, bearing seat spacing, axle diameter and axle straightness.

19 Claims, 15 Drawing Sheets

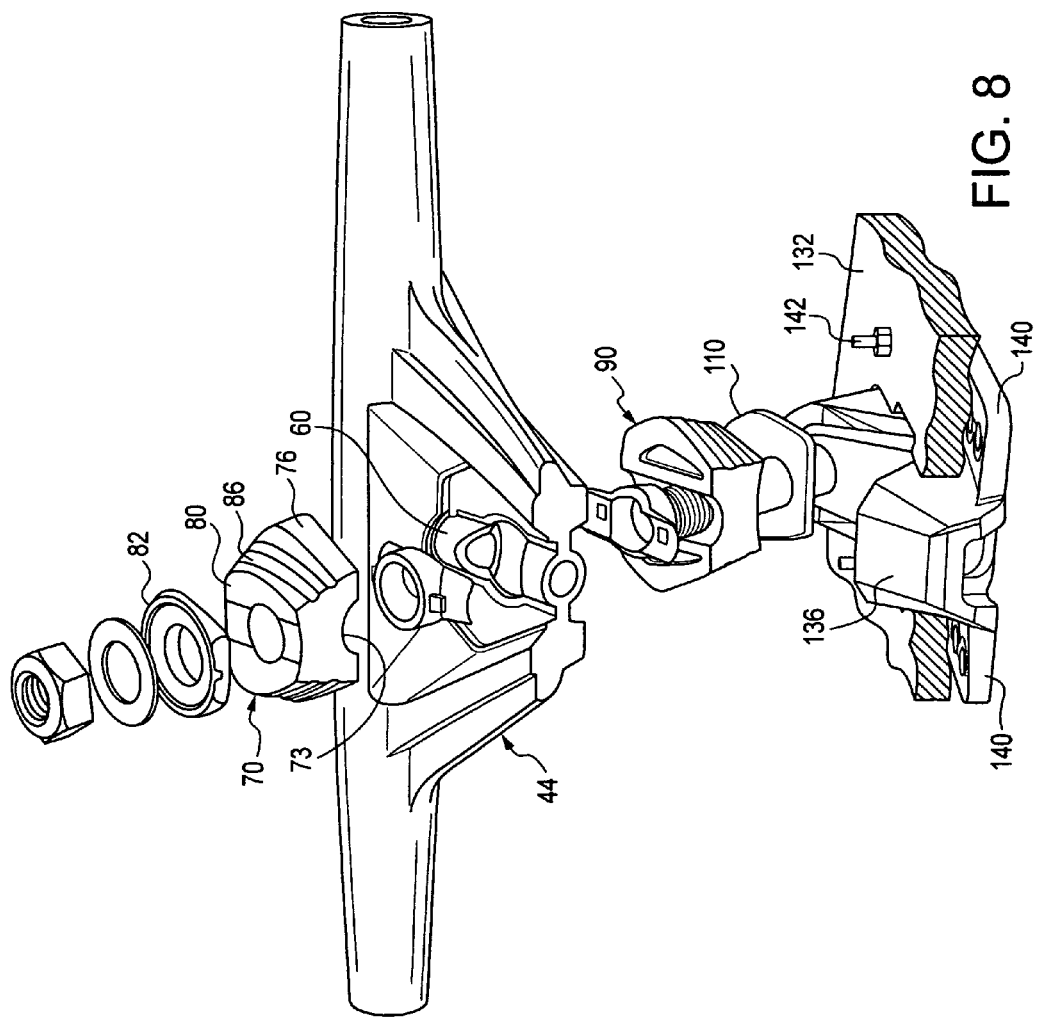

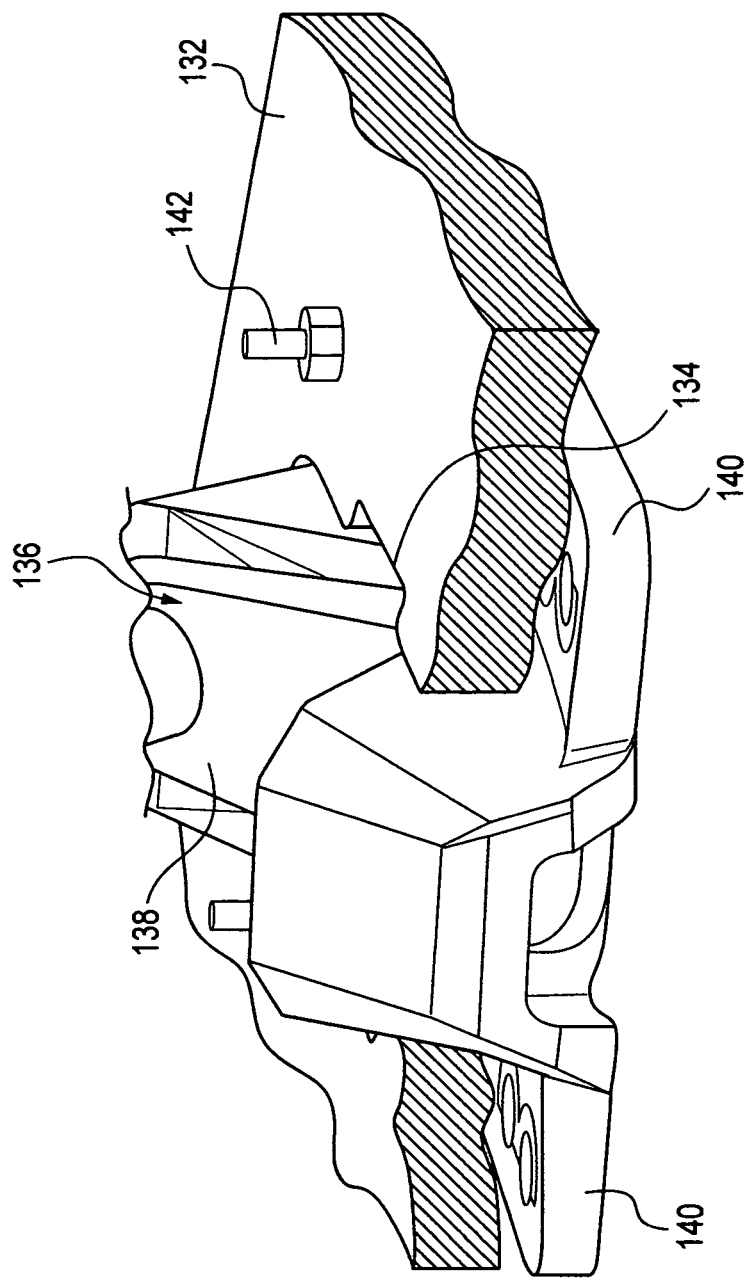

TRUCK AND WHEEL BEARING ASSEMBLY

This invention pertains to assemblies for mounting wheels to the underside of a skateboard deck or roller skate boot. More specifically it relates to a novel yoke, base, grommet, wheel and bearing combination in a skate truck to deliver high precision steering, advanced steering control, and more precise wheel alignment.

Conventional skateboards and roller skates are equipped with steering mechanisms known as trucks. The trucks are mounted on the underside of the board or boot opposite to each other, one in the front and one in the rear. Each truck carries two wheels, one at each end of the truck's axle. Each wheel is fitted with two bearings that fit into pockets integrated into the wheel body. The bearings are separated by a small gap in the middle of the wheel. This gap may be filled with a metal spacer that partially stabilizes and aligns the bearings.

Competition-level skateboarding and roller skating takes many forms, such as streetstyle, ramp riding, bowl riding, freestyle, slalom racing, and downhill racing. The equipment used by advanced skaters must meet exacting performance requirements. The truck or wheel chassis determines many of the most crucial performance characteristics.

Skate trucks serve four main purposes: 1) to connect the wheels to the deck or boot; 2) to provide wide-ranging steering response, whereby the wheel axles swivel to create a finite turning radius when, by means of lateral weight shifts, the skater tilts the deck or boot about its longitudinal axis; 3) by means of a resilient suspension system, to smoothly and predictably resist the skater's varying lateral weight shifts, thus stabilizing linear rolling motion and providing control over the steering response; and 4) by means of the same resilient suspension system, to return the deck or boot to the neutral, non-turning position after the skater discontinues a lateral weight shift. Skate wheel bearings serve the obvious purpose of aligning the wheels to the axles and minimizing rolling resistance.

Conventional skate trucks follow a basic design in which an axle pivots about an arm attached at one end to the center portion of the axle. The other end of this pivot arm is loosely fitted, at angles typically measuring 30° or 45°, into a plastic pivot cup mounted in a baseplate, thus forming a ball-like joint. A pair of doughnut-shaped grommets, usually made of rubber or urethane plastic of varying hardnesses, is mounted on a kingpin fixed at various angles in the baseplate on the side of the axle opposite the plastic cup. These grommets grasp a ring within, or extending from, the axle body so that the axle is suspended between the ball joint and the grommets. By adjusting the kingpin, the tension on the grommets may be increased or decreased, thereby varying the balance between turning stability and turning ease. Examples of this standard design are shown in U.S. Pat. No. 3,862,763, issued Jan. 28, 1975, to Gordon K. Ware; and in U.S. Pat. No. 4,109,925, issued Aug. 29, 1978 to Williams et al.

In these standard designs, the kingpin and the grommets do not precisely stabilize the axle body about the steering axis theoretically defined by the pivot arm rotating inside the plastic cup. The angle of the pivot axis tends to deteriorate as the axle tilts, so that tight turns may be difficult to achieve. The axle body is also substantially free to waiver sideward in response to side loads encountered during turns or straight-ahead riding. Steering control, range and overall performance are thereby compromised.

Furthermore, the standard design for the flexible plastic grommets results in poor steering control. Skaters control the tilt angle of the deck or boot, and thus the size of the turns they make, via lateral weight shifts of varying degree. Regardless of their hardness and no matter how they are adjusted, the conventional donut-shaped grommets do not offer an optimal or consistent pattern of resistance to such weight shifts. The result is that skaters cannot easily predict or measure how far to shift their weight to achieve turns of varying radii.

Finally, the bearings used in standard skate wheels require tolerance between their inner races and the truck axles. This means they are free to sit or rock out of alignment if one or more of the following conditions are met: the wheel bearing seats are not perfectly level; the wheel bearing seats are not precisely spaced; the spacer between the bearings is not perfectly dimensioned; no bearing spacer is used; the axle nut is not properly tensioned; and/or axle diameter and straightness are flawed. Bearings manufactured with an extended inner race element have been repurposed for skate wheels to partially address the aforementioned issues. But even these can sit or rock out of alignment if: the wheel bearing seats are not perfectly level; the wheel bearing seats are not precisely spaced; the axle nut is not properly tensioned; and/or axle diameter and straightness are flawed. The alignment distortion that may result can compromise bearing performance and longevity, directly impacting wheel rolling speed and traction.

SUMMARY OF THE INVENTION

In the present invention a high level of precision is provided to the trucks' steering action. This is accomplished by way of a cylindrical bearing which is seamlessly integrated between the axle hanger, i.e., the yoke which supports the axle on which the truck's wheels are mounted at either end, and novel grommets. The "positive" or male portions of the cylindrical bearing are formed on the grommet seats of the axle body, and to save weight this portion is made hollow, like a tube, between the pivot tip and the axle (See FIG. 5). The "negative" or female portions of the cylindrical bearing are formed on the surfaces of the two grommets that meet the hanger. These portions may be formed directly on the main body of the grommets, or else formed as separate elements, preferably using low friction material, and then joined to the main body of the grommets. The cylindrical bearing assembly constrains the axle body to pivot very precisely about the axis defined by the pivot arm and cup, with minimal up-down or side-to-side wavering.

The present invention improves steering control of the skateboard with novel contouring and construction of the grommets. The grommets do not feature the round doughnut shape with flat faces that is typically seen. Rather, they incorporate a substantially hexagonal shape and significantly more material on the sides, as well as a taper from broader faces that meet the hanger to narrower faces that meet the base plate and the tension nut, respectively, of a truck assembly. In addition, the narrower faces have beveled sides and join to hard end caps. Throughout a skater's turning stroke, these beveled contours constrain compressive forces to act in a substantially perpendicular orientation along the grommets' tapering outside walls, which are wider, taller and more voluminous compared to the side portions of conventional doughnut-shaped grommets. This ensures more direct and orderly resistance to compressive forces, as well as a longer compressive stroke and thus a larger steering range. In addition, the grommet's tapering sides minimize excessive "packing" of the flexible grommet material so as to create a more optimal steering control profile.

Empty pockets may be optionally formed within the grommet assemblies, for example between the grommet body and the end caps or along the sides of the female bearing portion, to further refine the steering resistance profile. Resilient elements such as wave springs may be optionally molded within the grommet bodies to enhance rebound or energy return. Laterally-flexing features may be optionally added between the female bearing elements and the grommet bodies to provide controlled speed-sensitive steering, whereby the increased side loads encountered during high speed turns will gradually move the hangers into positions of less steer.

The hard end cap joined to the lower grommet forms a mechanical lock with the contours of its seat on the base plate, thus eliminating the need for the separate round cap washer which is conventionally seen. The beveled interface between the hard end caps and the main grommet body also discourages the compressible material from flexing over the sides of its seat.

The present invention also includes bearings with integral half-spacers ending in wide flat flanges which square up and self-stabilize inside the wheels. The wide flat flanges form a self-aligning system which corrects flaws in bearing seat levelness, bearing seat spacing, axle diameter and axle straightness. The superior alignment results in reduced friction within the bearings, longer bearing life, faster rolling, and enhanced wheel grip.

Other objects and advantages of this invention will become apparent from a consideration of the following drawings and detailed description.

BRIEF DESCRIPTION OF THE DRAWINGS

For a more complete understanding of this invention, reference should be made to the accompanying drawings in which:

FIG. 8 is an exploded and perspective view of central portions of the rear truck assembly shown in FIG. 4 engaged on a portion of the skateboard in a form of mounting which is an alternative to the form of mounting shown in FIG. 1;

FIG. 8A is an enlarged portion of the rear truck assembly and skateboard portion shown in FIG. 8;

DETAILED DESCRIPTION OF THE PREFERRED EMBODIMENT

Figure 1:
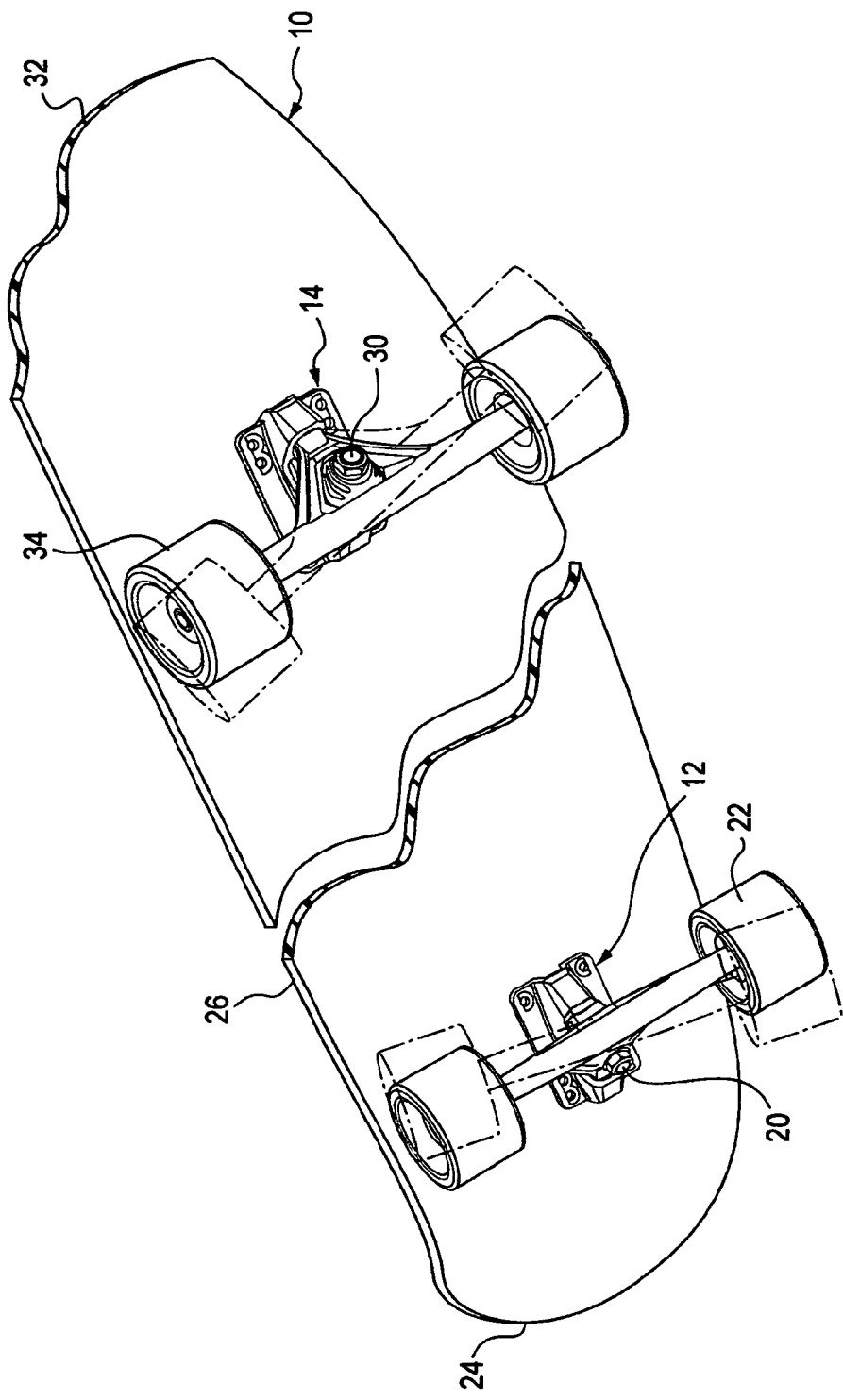
FIG. 1 is a perspective view of the underside of a skateboard, partially broken away, including a depiction of the trucks of the present invention mounted on the underside of the board and movable to various positions including the positions shown in phantom.

In the drawings, one preferred embodiment of the invention is shown which is a skateboard 10 supported upon a pair of novel trucks 12 and 14. While the preferred embodiment is a skateboard, it should be understood that the invention, including its various elements, will also be applicable to other rolling platform vehicles, such as a roller skate, which are powered by the rider, or by gravity, or by some combination thereof. Also, in the following paragraphs the truck 12 which is mounted toward the rear of the skateboard will be the truck principally described, but it will also be understood that the truck 14 which is mounted toward the front of the skateboard has an identical construction.

However, the kingpin, or post, 20 on which the rear truck wheels 22 articulate has a longitudinal axis extending toward the rear end, or tail, 24 of the skateboard deck 26. The kingpin, or post 30 in truck 14 mounted toward the front, or nose 32 of the skateboard has a longitudinal axis which extends toward the nose of the skateboard, and the front truck wheels 34 articulate on this post. The front and rear trucks, 14 and 12 respectively, are thus oppositely disposed to each other.

As shown in FIG. 1 in solid lines, wheels 22 and 34 of the rear truck 12 and front truck 14, respectively, are in a straight-forward attitude when the axles, such as axle 36 of the rear truck 12, are normal to a straight-line path incorporating the longitudinal axis of the skateboard 10. The skateboarder's weight, if one were present on top of the skateboard, would normally be equally distributed toward both outer edges of the skateboard. As shown in phantom in FIG. 1, and in solid lines in FIG. 2, the trucks are turned to execute a right turn, with a skateboarder's weight predominantly on the side of the skateboard closest to the viewer in FIG. 2. With the skateboarder's weight thus distributed, the weight on the right side of the skateboard pressing downwardly in the direction of arrows 42 causes the wheels on the right side of the skateboard to move closer together. The nose of the board swings in an arc toward the right and the tail of the skateboard swings in an arc out to the left to orient the longitudinal axis of the skateboard deck in a right turn.

Figure 3:
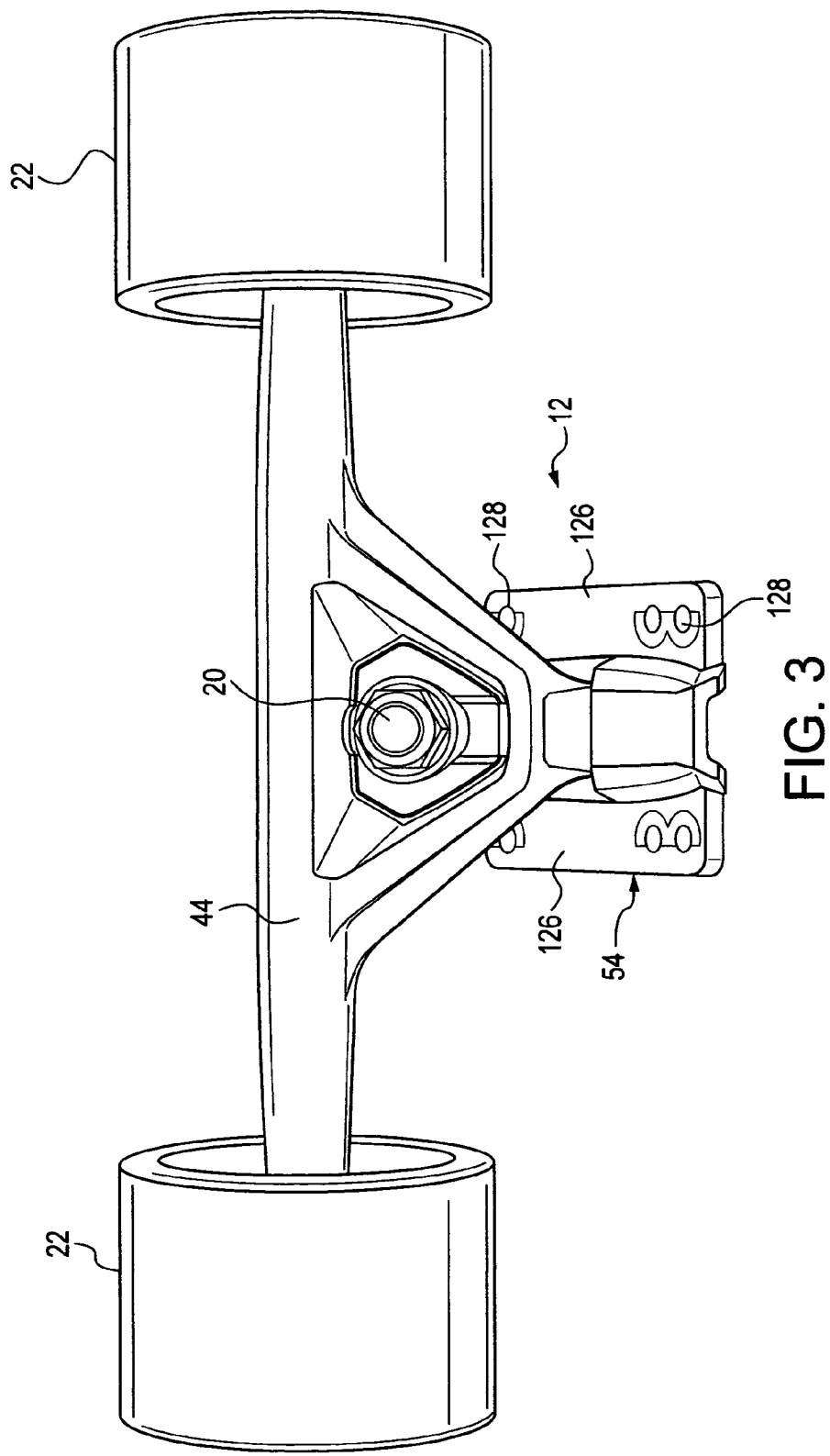
FIG. 3 is a perspective view of the rear truck assembly shown in FIGS. 1 and 2, viewing the axle hanger upwardly from underneath the skateboard deck and showing the wheels of the truck aligned in a straight ahead position.
Figure 4:
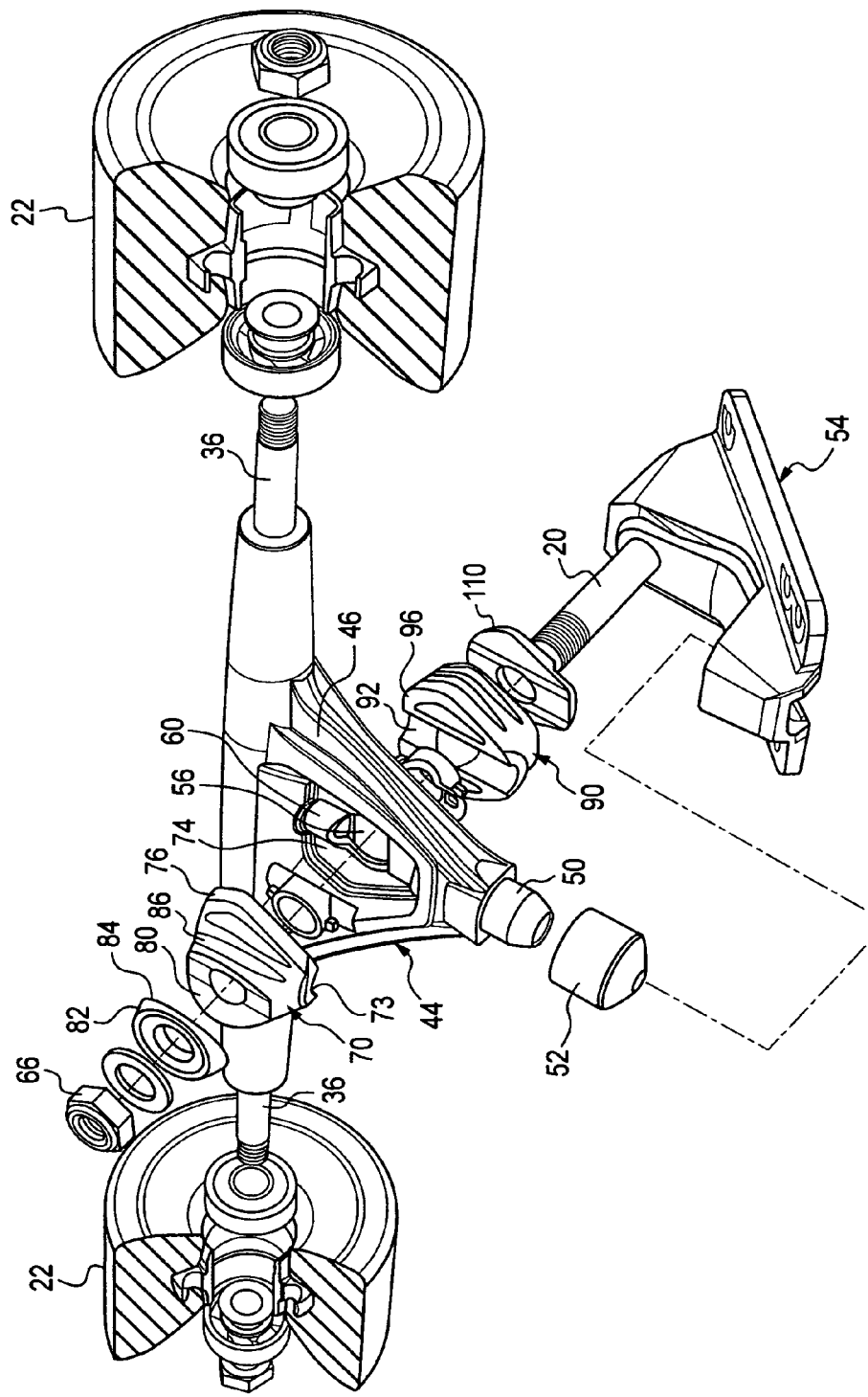
FIG. 4 is an enlarged, exploded view of the rear truck assembly shown in FIG. 3, with the wheel portions partially broken away.

Rear truck 12 is illustrated in FIG. 3 in its assembled state with wheels 22 mounted on axle 36. An exploded view of the truck 12 is shown in FIG. 4. A yoke, or hanger, 44 supports the axle 36 and connects the entire truck and wheel bearing assembly to the skateboard 10. The body portion 46 of the yoke is supported on its pivot tip 50 in a pivot cup 52 which is, in turn housed in a pocket in one end of truck base plate 54. The pivot cup is usually made of a lubricious plastic so that the pivot tip 50 can easily turn in a multitude of directions within it as the yoke 44 moves in an arcuate path about the base plate 54 to dispose the wheels 22 from one position to another.

Figure 5:
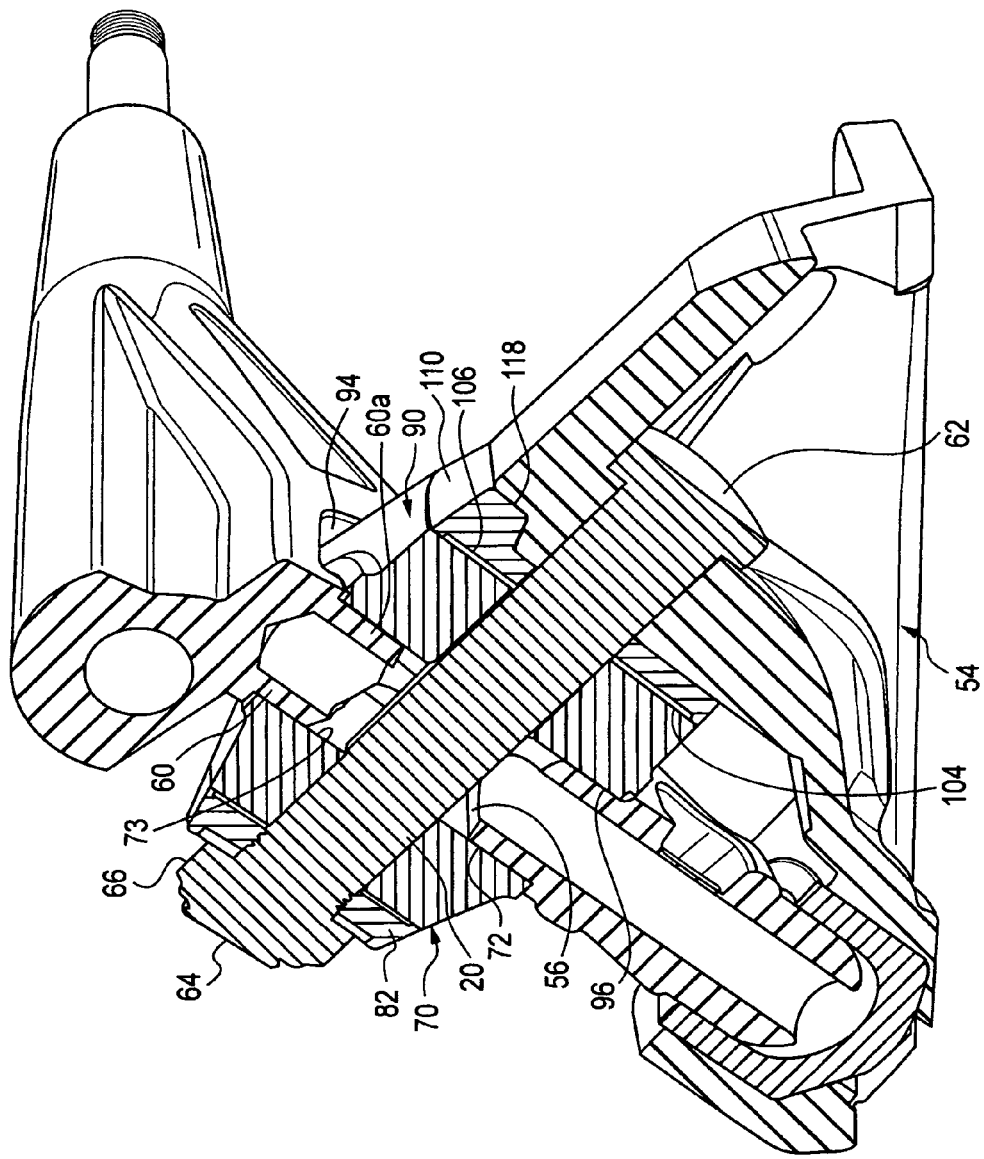
FIG. 5 is an enlarged view, partially in perspective, of an assembled portion of the rear truck assembly shown in FIG. 5 sectioned in the direction of the arrows 5-5 shown in FIG. 4.

A first aperture 56 is formed in a central portion of the yoke 44, spaced apart from the pivot tip 50, so that the yoke 44 may also be mounted on the kingpin 20. A cylindrical bearing member 60, which is part of the yoke, is located adjacent to the first aperture. The size of the opening through that aperture is somewhat larger than the diameter of the kingpin, or post, 20 so that the yoke 44 is able to be fitted to the post during assembly and tilted in various attitudes while the yoke is maintained on the post. As shown in FIG. 5, the post 20 has a head portion 62 lodged in the base plate 54 and extends through the first aperture 56 to a distal end 64 where it is engaged by a tension nut 66. Preferably, the tension nut is threadably engaged on the post's distal end 64 so that pressure on the elements of the yoke mounting assembly between the head of post 20 and its distal end 64 can be adjusted.

A resilient first grommet 70 is engaged on the post 20 and the bearing member 60 on the underside of the yoke 44. Grommet 70 has a first face 72 which is engaged on the cylindrical bearing member 60 adjacent the first aperture 56. The outer surface of the bearing member 60 is cylindrical, and a cylindrically shaped groove bearing surface 73 in first face 72 is configured for complementary engagement with the cylindrical surface of the bearing member 60 in the yoke. Such an engagement precisely regulates and restricts the arcuate movement of the yoke. The bearing member is able to rotably slide through its interface with the first face of the grommet as the flat surface adjacent the bearing member 60 compresses the flat surface on the grommet adjacent the bearing groove 73.

In the body portion 46 of yoke 44 there is a recessed area 74 which has perimeter walls adjacent to the bearing member 60. A collar section 76 of the first grommet is sized and configured to be fitted within those walls, and thus the walls of the recess grasp and hold the grommet in place. Preferably, the configuration of the walls forms a hexagonal recess, but similar configurations of the walls which intercept the collar section 76 may be used.

The first grommet 70 has sides which taper from a larger end of the grommet adjacent to the first face 72 to a smaller end adjacent to a second face 80. Those sides form a cone from the first face 72 at the larger end of the grommet which is configured for engagement with the bearing member 60 to the second face 80 at the smaller end of the grommet which is configured for proximate engagement with the tension nut 66. Preferably the second face 80 is beveled. An end cap 82 which has a beveled surface 84 complementary to the second face 80 is interposed on post 20 between the grommet and the tension nut. The end cap 82 is also made of a harder material than grommet 70, thus forming a hard, stable point of connection for the grommet at its second face 80. The sides of the grommet are provided with external fissures 86, and on the interior, as will shortly be described, the sides are internally hollow.

These configurations of grommet 70 produce improved results for a skater. The contours of the beveled second face 80 constrain compressive forces to act in a substantially perpendicular orientation along the tapering outside walls, which are wider, taller and more voluminous compared to the side portions of conventional doughnut-shaped grommets. This insures more direct and orderly resistance to compressive forces, as well as a longer compressive stroke and thus a larger steering range. The tapering sides minimize excessive packing of the flexible grommet material so as to create a more optimal steering control profile.

In the first face 72, the cylindrical bearing member 60 may be formed directly on the main body of grommet 70, or else formed as a separate element, preferably using low friction material, and then joined to the main body of the grommet.

The cylindrical bearing assembly constrains yoke 44 to pivot very precisely about the axis defined by the pivot tip 50 and the pivot cup 52 with minimal up-down or side-to-side wavering. At the same time the cylindrical bearing assembly resists the increased side loads encountered during high-speed turns more progressively compared to conventional constructions. As side loads increase, the female bearing portion of the bearing in the first face, i.e., cylindrically shaped groove 73, will gradually, rather than suddenly, flex under pressure from the male bearing portion in the yoke, i.e., cylindrical bearing member 60, thereby allowing the yoke 44 to gradually move into positions of progressively slower steering, which is a desirable speed-sensitive steering effect.

As shown particularly in FIG. 5, the cylindrical bearing member 60 includes a cylindrical side 60a across the aperture 56 from the first grommet 70. Side 60a of the cylindrical bearing faces the base plate 54. A second grommet 90, which is quite similar to first grommet 70, has a cylindrically shaped bearing surface 92 with which the second grommet engages the bearing surface 62a. There is a recessed area 94 on the base plate side of the yoke into which a first face 96 of the second grommet fits in a non-rotating manner like the first grommet does on the other side of yoke 44. When first face 96 is so inserted, the second grommet engages its bearing surface 92 with the bearing 60.

Figure 6:
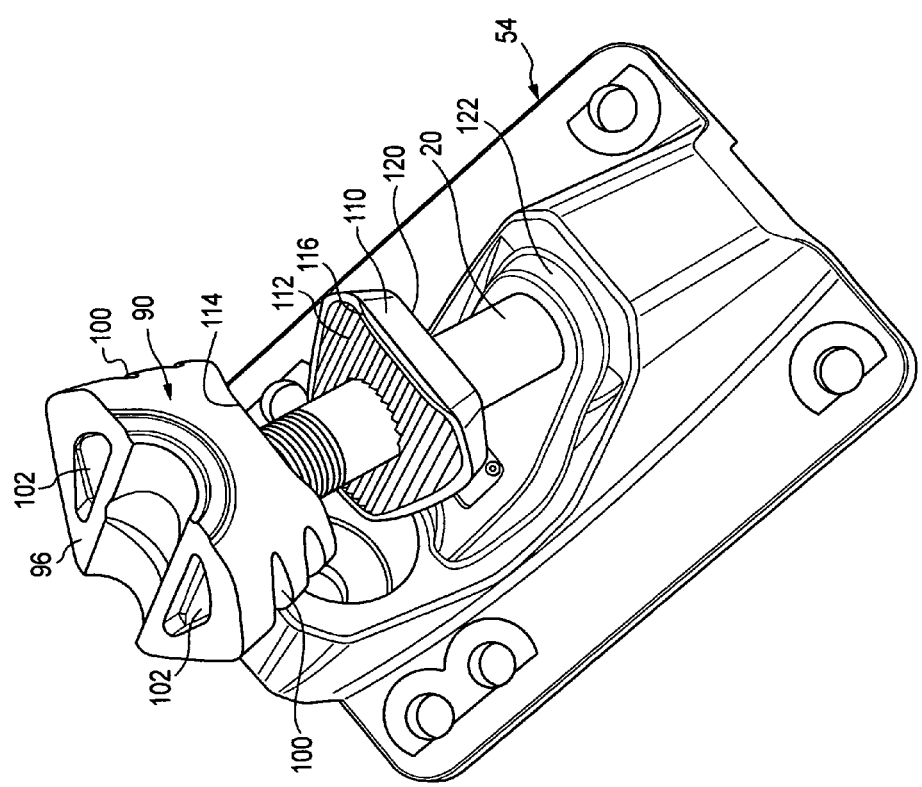
FIG. 6 is an enlarged and partially assembled view of the base plate and grommet assembly of the rear truck assembly shown in FIG. 4, with the axle hanger assembly omitted.
Figure 7:
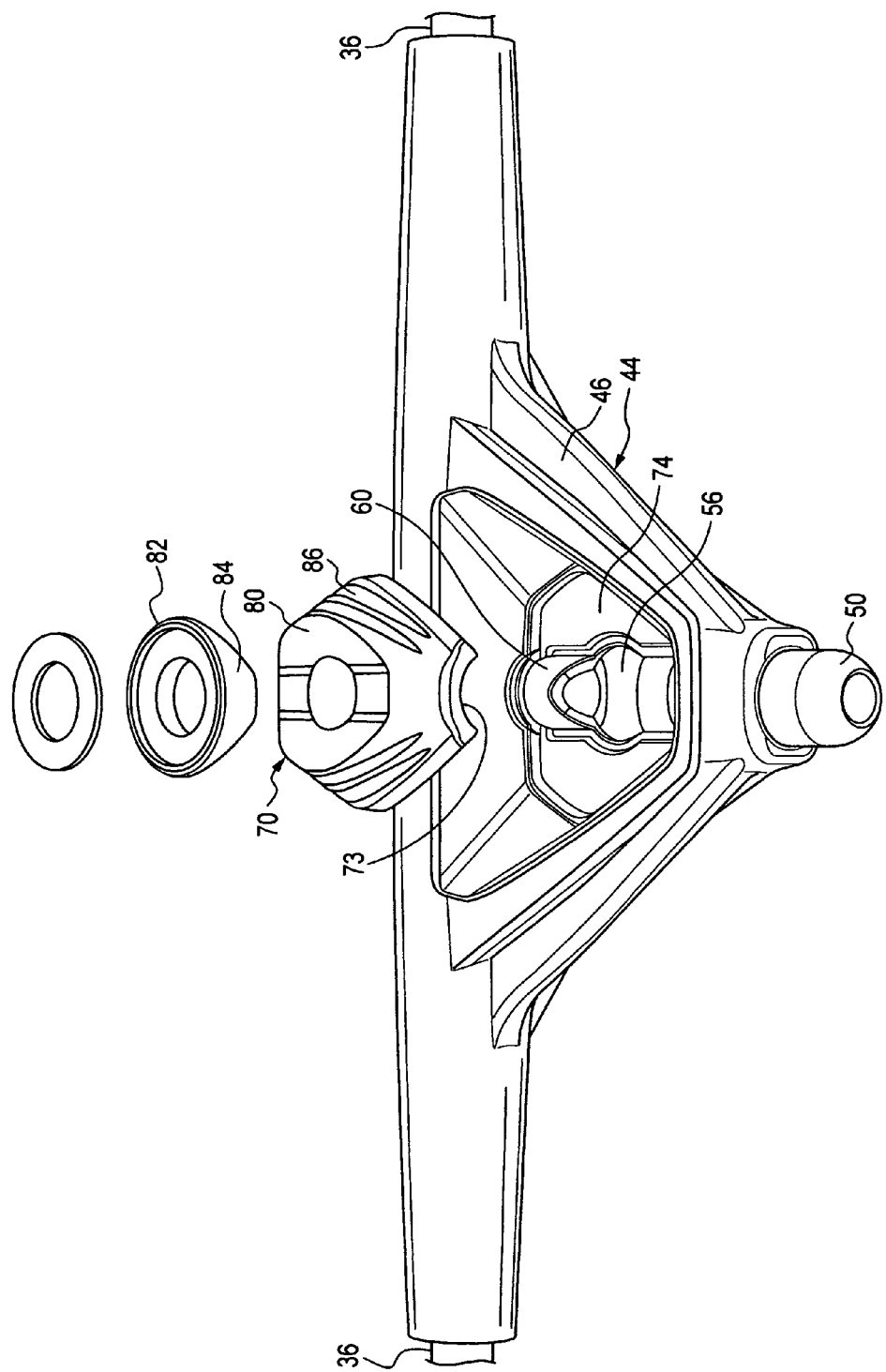
FIG. 7 is an exploded view of elements of the axle hanger assembly of the rear truck assembly shown in FIG. 4.
Figure 9:
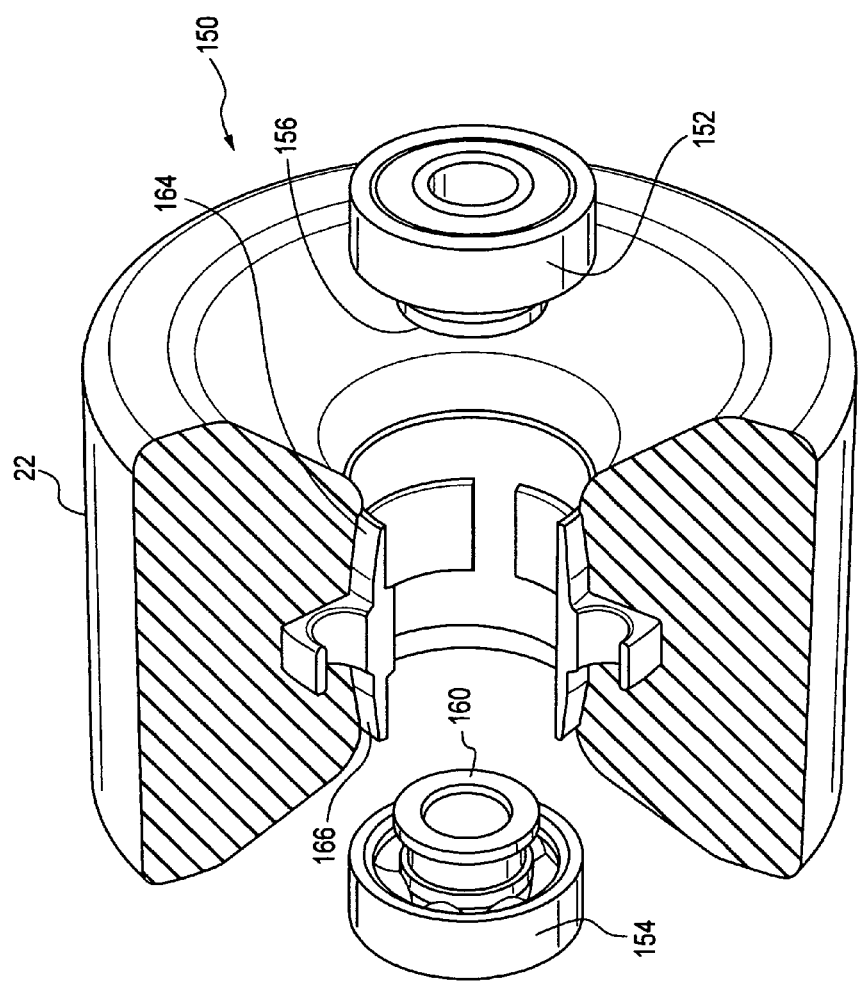
FIG. 9 is an enlarged and exploded view, partially broken away, of a wheel portion of the rear truck wheel assembly shown in FIG. 4.

As shown in FIGS. 4 and 6, fissures 100 are formed on the outside walls of the second grommet, and the interiors of the grommet walls are hollowed out as at hollows 102. A second face 104 on the second grommet, spaced apart from the second grommet's first face 96, contains a plurality of first locking members 106. An end cap 110, which is disposed on post 20, has a plurality of second locking members 112 arranged for complementary engagement with the first locking members 106. The surfaces of the locking members may be ridged, and the surfaces 114 of the second grommet and 116 of the end cap 110 which engage each other beveled, as illustrated in FIG. 6. The end cap 110 also includes a face 118 opposite the second locking members 112 which can be fixed on the base plate 54, as by incorporating a cup 120 which is arranged to match the configurations 122 on the base plate.

The second grommet, like the first, incorporates a substantially hexagonal shape and significantly more material on the sides, as well as a taper from broader faces that meet the yoke to narrower faces that meet the base plate. The narrow second face has beveled sides that join the hard end cap. Throughout a skater's turning stroke, these beveled surfaces constrain compressive forces to act in a substantially perpendicular orientation along the second grommet's tapering walls, which are wider, taller and more voluminous compared to the side portions of conventional doughnut-shaped grommets. This insures more direct and orderly resistance to compressive forces, as well as a longer compressive stroke and thus a larger steering range. In addition, the grommet's tapering sides minimize packing of the flexible grommet material so as to create a more optimal steering control profile.

The end cap 110 forms a mechanical lock with the contours of its seat on the base plate, thus eliminating any need for a separate round cap washer in an assembly that is conventionally seen. The beveled interface between the end cap and the second grommet body also discourages compressible material from flexing over the sides of its seat.

A normal type of mounting for a truck such as truck 12 onto the underside of a skateboard is shown in FIG. 1, that is, to fasten the flanges 126 to the underside of deck 26 with screw or bolts inserted through the mounting holes 128 in the flanges. An alternative type of mounting is shown in FIG. 8A, known as a "dropthrough" mounting. In that alternative, skateboard deck 132 is provided with an opening 134 which is arranged to fit the footprint of a truck structure beyond the flanges, i.e., a socket into which the superstructure of the truck fits. Truck 136 is mounted this way in FIG. 8A. The superstructure 138 of the truck extends through the deck 132, leaving flanges 140 on the other side, i.e., the top side of the deck. The truck is fastened in place using one or more bolts 142. The deck-engaging surfaces of flanges 140 feature a convex contour to provide complementary engagement in the "dropthrough" mounting on the top surface of the deck, which normally has a concave contour. Small circular flat areas are preserved in the corners of the base plate's top surfaces to form stable seats for the mounting nuts when the truck is assembled onto the deck in the normal manner shown in FIG. 1.

Figure 10:
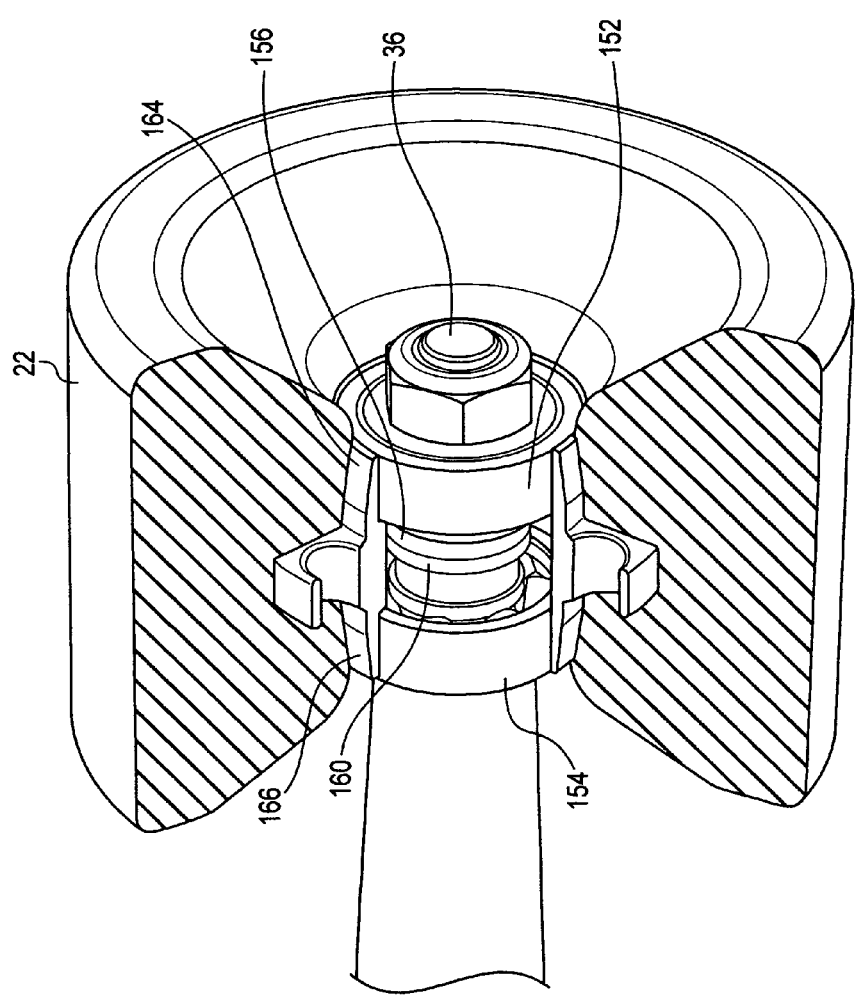
FIG. 10 is a perspective view, partially broken away, of the wheel portion of the rear truck assembly shown in FIG. 9 after the wheel portion has been assembled.
Figure 11:
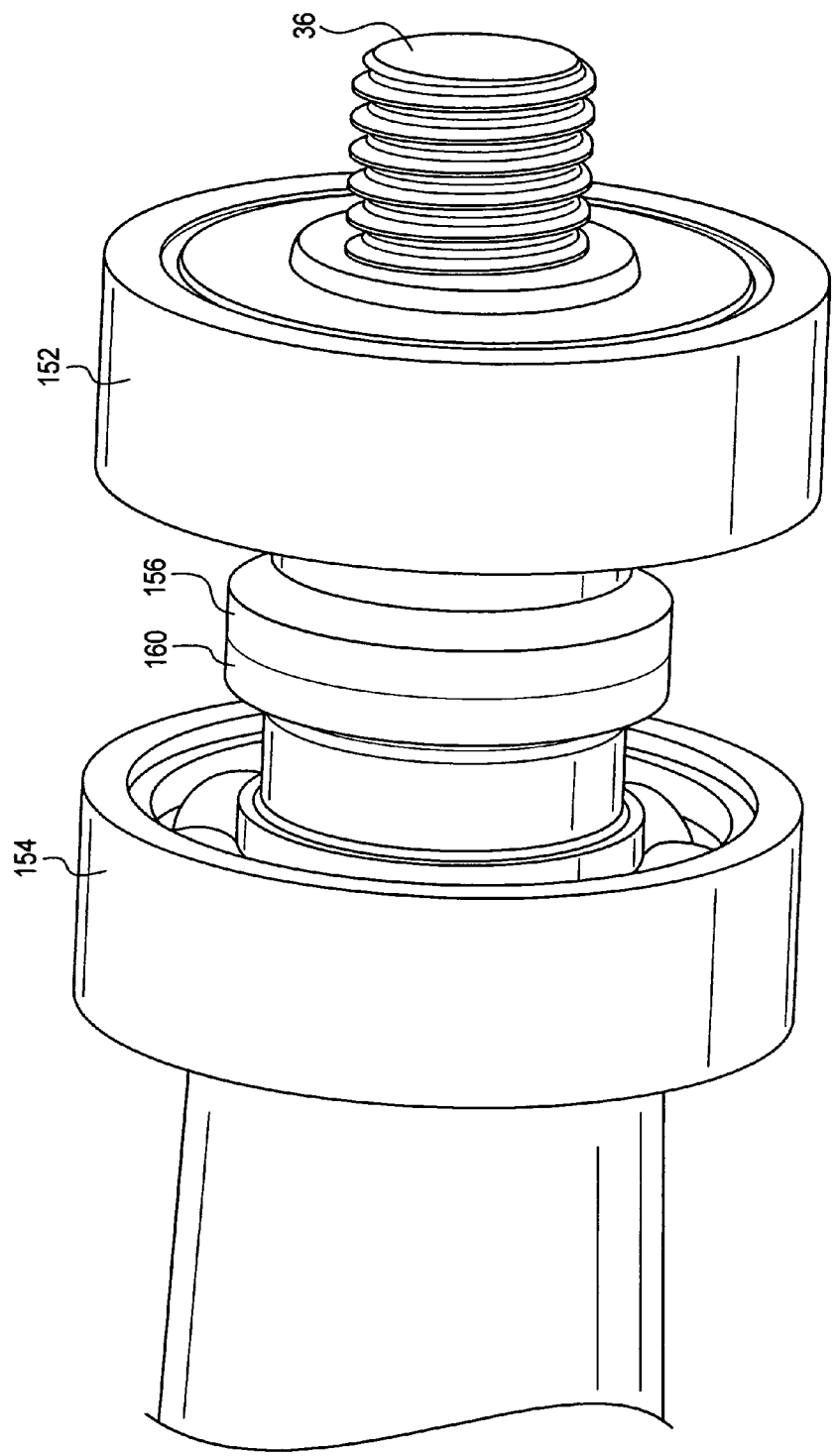
FIG. 11 is an enlarged perspective view of the assembled bearings in the wheel portion shown in FIG. 10.
Figure 12:
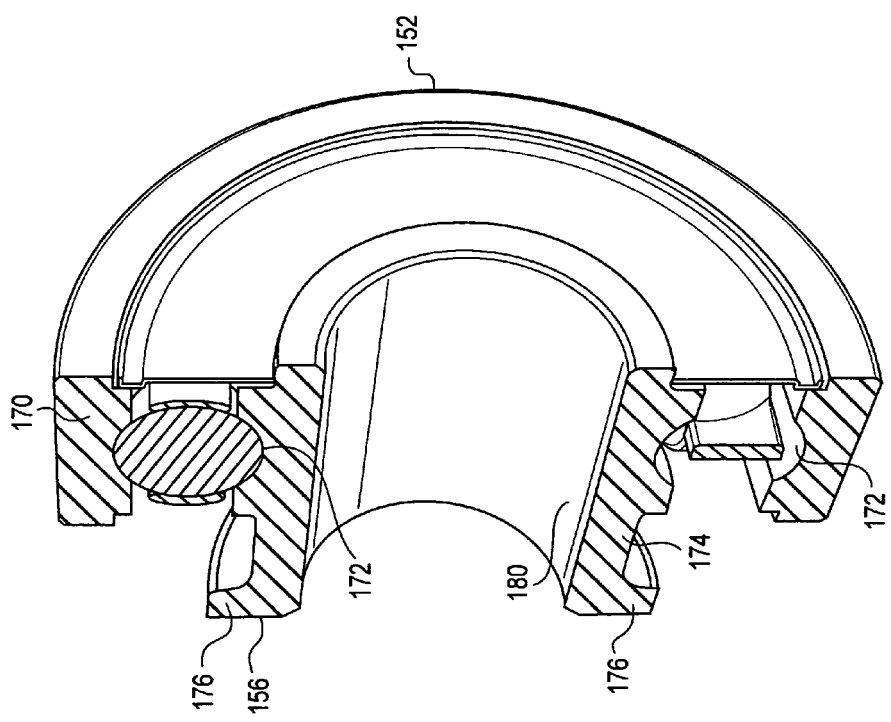
FIG. 12 is a perspective view of one of the wheel bearings shown in FIG. 11, broken away along the line 11-11 shown in FIG. 11.
Figure 13:
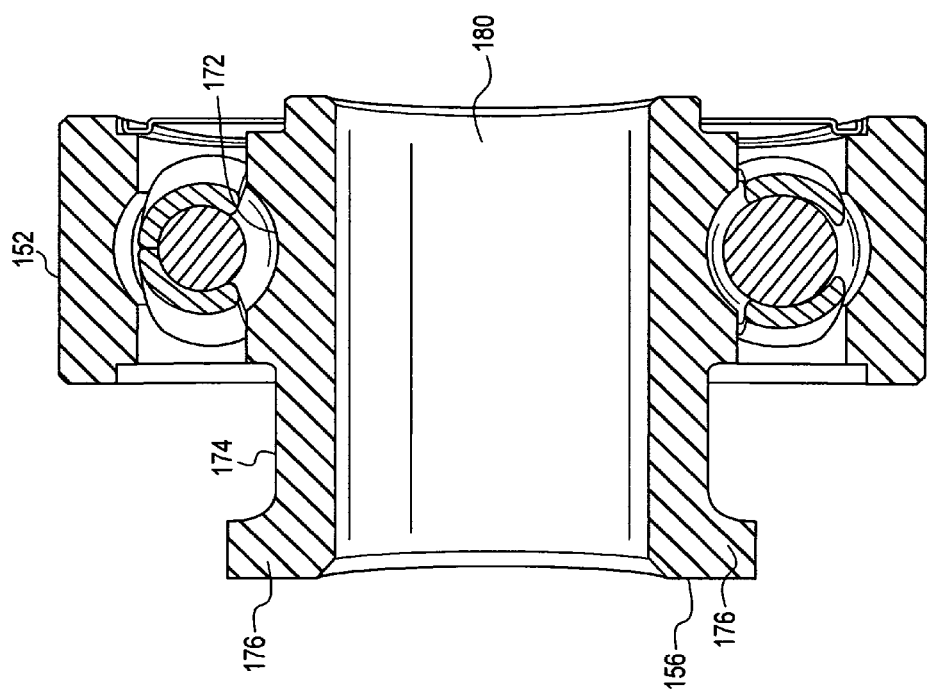
FIG. 13 is a head on view of the broken-away face of the wheel bearing shown in FIG. 12.

The wheel bearing assembly 150 shown in FIGS. 9 through 13 is also an important part of the entire truck 12 for accomplishing smooth and improved control of a skateboard or roller-skate. In wheels 22, shown in an enlarged, broken-away view in FIG. 9, first and second ball bearings are enclosed in casings 152 and 154. On the first casing, 152, there is a bell 156 on the exterior of the casing, and on the second casing 154 there is a second bell 160. The bells 156 and 160 meet, as shown in FIGS. 10 and 11, when the casings 152 and 154 are assembled on axle 36 and disposed in their respective housings 164 and 166. The bells 156 and 160 are slideably disposed on each other but may also be positively joined inside the wheel.

More particularly, the wheel bearing assembly 150 for wheel 22 on axle 36 incorporates a first ball bearing casing 152 which has an inner casing portion 170 for bearing balls in a first race 172 and an extension section 174 beyond the first race. At the extremity of the extension section there is a first flange 176 which extends outwardly from axle 36 when the axle is disposed in channel 180 through the bearing. The second ball bearing casing 154 mirrors casing 152, with an inner, second race and culminating in a flange beyond the second race which extends outwardly from axle 36. The first and second flanges are disposed against each other within the wheel when they are assembled in their housings, or bearing seats, and disposed on axle 36. When so disposed, the two flanges square up and self-stabilize. They form a self-aligning system which compensates for flaws in bearing seat levelness, bearing seat spacing, axle diameter and axle straightness. This assembly results in reduced friction within the bearings, longer bearing life, faster rolling, and enhanced wheel grip.

Figure 2:
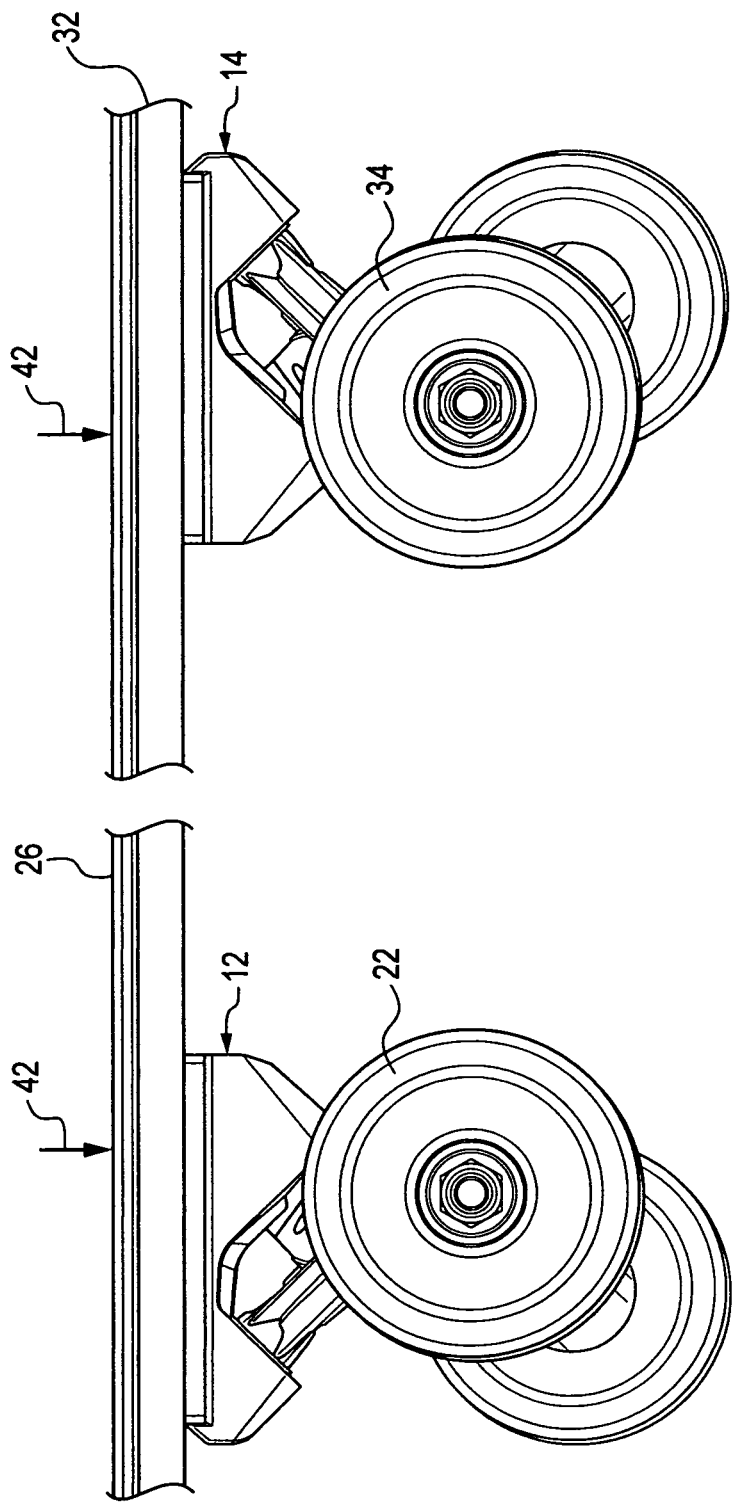
FIG. 2 is an elevational view of the skateboard shown in FIG. 1 when a skateboarder's weight is moved toward the viewer of FIG. 2 and showing the trucks with the foreground wheels moved closer to the deck of the skateboard to accomplish a right turn of the skateboard.
Figure 14:
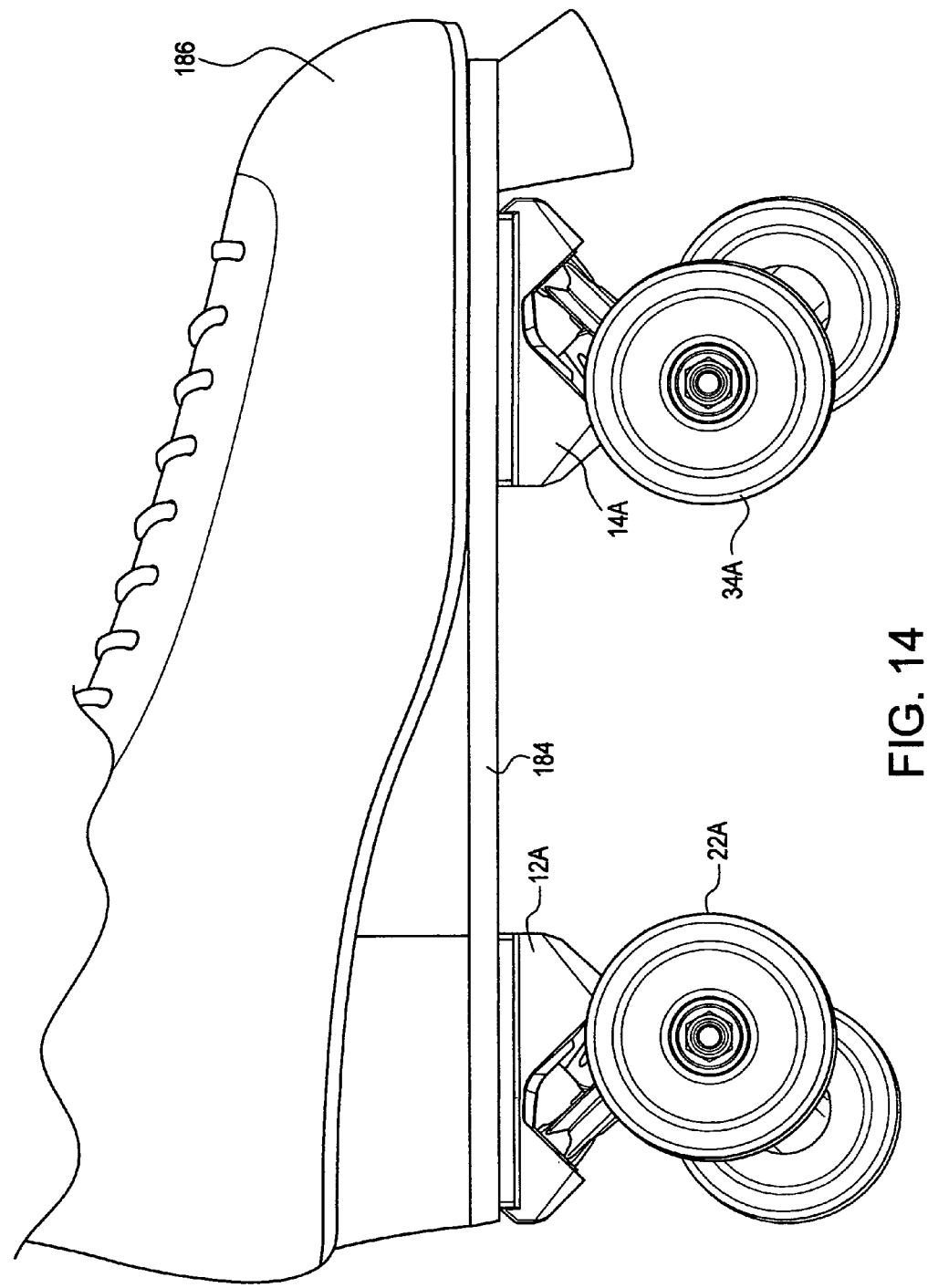
FIG. 14 is an elevational view of a roller skate with truck assemblies of the present invention mounted on the underside of the boot.

As shown in FIG. 14, the truck and wheel bearing assembly more particularly described above may be mounted on the underside of a roller-skate deck 184 to which a skater's boot 186 is affixed. Rear truck 12A and front truck 14A are illustrated with their rear and front wheels 22A and 34A, respectively, turned in the same attitude as the wheels illustrated in FIG. 2 are turned beneath a skateboard.

Those skilled in the art will readily see that while numerous detailed variations of the above-described embodiments if this invention may be made, the true scope of the invention is to be determined by the following claims.

I claim:

1. A skateboard or roller-skate truck comprising
a base plate,
a yoke including
a body portion moveable in arcuate paths about the base plate,
a first aperture formed in the body portion, and
a bearing member adjacent the first aperture,
a post extending from the base plate through the first aperture adjacent the bearing member, and
a resilient first grommet engaged on the post and the bearing member adjacent the first aperture adapted to restrict arcuate movements of the yoke and having
a cylindrical first face configured for complementary engagement with a cylindrical surface on the bearing member.

2. The truck of claim 1 in which the first face on the grommet is concave and configured for engagement with a convex surface on the bearing member.

3. The truck of claim 1 in which
the yoke includes a recessed area having perimeter walls formed in the body portion adjacent to the bearing member, and
the first grommet includes a collar section which is fitted into the perimeter walls of the recessed area.

4. The truck of claim 3 in which the recessed area is hexagonal.

5. A skateboard or roller-skate truck comprising
a base plate,
a yoke including
a body portion moveable in arcuate paths about the base plate,
a first aperture formed in the body portion, and
a bearing member adjacent the first aperture,
a post extending from the base plate through the first aperture adjacent the bearing member, and
resilient first and second grommets having fissures formed in the sides of at least one of the grommets engaged on the post and bearing member on opposite sides of the yoke adjacent the first aperture and adapted to restrict arcuate movements of the yoke.

6. The truck of claim 5 in which the sides of at least one of the grommets are internally hollow.

7. The truck of claim 5 which includes
an end cap disposed on the post, and
the second grommet is cone-shaped from a larger end adjacent a first face configured for engagement with the bearing member to a smaller end adjacent a second face configured for complementary engagement to the end cap.

8. The truck of claim 7 which includes
a beveled surface on the second face of the second grommet, and
a beveled surface on the end cap complementary to the second face of the second grommet.

9. A skateboard or roller-skate truck comprising
a base plate,
a yoke including
a body portion moveable in arcuate paths about the base plate,
a first aperture formed in the body portion, and
a bearing member adjacent the first aperture,
a post extending from the base plate through the first aperture adjacent the bearing member, and
resilient first and second grommets engaged on the post and bearing member on opposite sides of the yoke adjacent the first aperture and adapted to restrict arcuate movements of the yoke,
the second grommet including
a first face engaged on the bearing member and
a second face spaced apart from the first face containing a plurality of first locking members, and
an end cap disposed on the post having a plurality of second locking members arranged for complementary engagement with the first locking members.

10. The truck of claim 9 in which the sides of the first grommet taper from a larger end of the grommet adjacent to a first face on the grommet to a smaller end adjacent to a second face on the grommet.

11. The truck of claim 9 which includes a tension nut on the post spaced apart from the first aperture by the first grommet and moveable against the first grommet to increase compression thereon.

12. The truck of claim 11 in which the first grommet is cone-shaped from a larger end adjacent a first face configured for engagement with the bearing member to a smaller end adjacent a second face configured for proximate engagement to the tension nut.

13. The truck of claim 12 in which
the second face of the first grommet includes a beveled surface, and
an end cap having a beveled face complementary to the second face of the first grommet is interposed on the post between the first grommet and the tension nut.

14. The truck of claim 13 in which the end cap is harder material than the first grommet.

15. The truck of claim 9 in which the end cap is a harder material than the second grommet.

16. The truck of claim 9 in which the first locking members and the second locking members are complementary ridges.

17. The truck of claim 9 in which the end cap engaged on the first locking members includes a face opposite the second locking members adapted to be fixed on the base plate of the truck.

18. The truck of claim 17 in which the face of the end cap opposite the second locking members is a cup configured for complementary engagement with the base plate of the truck.

19. The truck of claim 17 in which the face of the end cap opposite the second locking members includes a ridged contour adapted for mating engagement with the base plate of the truck.

* * * * *